United States Patent [19]

Walther

[11] Patent Number: 5,251,668
[45] Date of Patent: Oct. 12, 1993

[54] COUPLING SUITABLE FOR USE IN REFUELING LINES OR THE LIKE

[75] Inventor: Henning D. Walther, Haan, Fed. Rep. of Germany

[73] Assignee: Carl Kurt Walther GmbH & Co. KG, Wuppertal, Fed. Rep. of Germany

[21] Appl. No.: 766,583

[22] Filed: Sep. 27, 1991

[30] Foreign Application Priority Data

Dec. 14, 1990 [DE] Fed. Rep. of Germany ....... 4040077

[51] Int. Cl.$^5$ ..................... F16K 31/122; F16K 31/46
[52] U.S. Cl. ................. 137/614.06; 285/306; 285/920
[58] Field of Search .............. 137/614, 614.06, 614.01, 137/614.02, 614.05; 251/149.9, 148; 285/305, 306, 308, 920

[56] References Cited

U.S. PATENT DOCUMENTS 2,887,124  5/1959  Mehl ........................... 137/614.06 X
4,188,050  2/1980  Lochte .
4,805,417  2/1989  Weaver et al. ................. 137/614 X

FOREIGN PATENT DOCUMENTS 1290017  2/1969  Fed. Rep. of Germany .
3624135  1/1988  Fed. Rep. of Germany .

*Primary Examiner*—Martin P. Schwadron
*Assistant Examiner*—Kevin L. Lee
*Attorney, Agent, or Firm*—Martin A. Farber

[57] ABSTRACT

A coupling which can be used in fueling lines (L1, L2) or the like, the coupling having a closure device which blocks the flow path of the fluid and are brought automatically into closed position as a function of a sensor-recorded displacement of the feed line with respect to the discharge line; in order to achieve a functionally optimized solution, the coupling is developed as rapid-closure coupling (K) having an ejector ram (41) acted on by pressure fluid as a result of the action of a sensor, for the separation of the two coupling halves (I, II) which have previously been brought individually into the closed position (closing of the shut-off valves V1, V2), also due to the action of a sensor.

8 Claims, 6 Drawing Sheets

COUPLING SUITABLE FOR USE IN REFUELING LINES OR THE LIKE

FIELD AND BACKGROUND OF THE INVENTION

The present invention relates to a coupling which can be used in refueling lines or the like and has closure means which block the path of flow of the fluid and are automatically brought into the closed position as a function of a sensor-recorded displacement of the feed line with respect to the discharge line.

Such couplings are used in large facilities, particularly in ship-loading systems, as so-called drift-protection system. Despite the sensor-recorded identification, the operation of the corresponding devices, mostly in the form of expensive, very heavy ball valves, is extremely sluggish. The leakage losses which also cannot be prevented here, constitute a severe environmental problem although some progress can already be noted here as compared with emergency cutoff devices which are also known, namely the conventional predetermined break-point devices.

SUMMARY OF THE INVENTION

It is the object of the present invention to optimize the reliability in use and operation of a coupling of this type in a manner which is simple to manufacture while retaining the sensor recording.

As a result of the present invention, there is obtained a coupling which can be rapidly and easily adapted without depositing, a reliable manner of refueling, and dependable control of emergency situations. The structural means are simple and suitable for the purpose. Concretely, it is proposed with regard hereto that the coupling be developed as a rapid-closure coupling having an ejection ram acted on, as a result of the action of the sensor, by a pressure fluid for the separation of the two coupling halves which have each been previously brought into the closed position also as the result of sensor action. Such a coupling is lighter, due to the weight acting on the loading arm, than the above-mentioned rather heavy ball valves. There is no leakage. The adapting, opening and closing of the coupling halves, i.e. of their shut-off valves, also takes place rapidly as does the ejection of the one coupling half which is ejected last, in this case, for instance, the one on the ship side. Even the slightest disturbing contour (emergence from the angle of extent) initiates the separation. Today's stricter environmental conditions are extremely well taken into account, particularly as the rapid-closure couplings—which by their very nature have favorable properties—are particularly favorable here.

From the standpoint of the above-mentioned further development, it is advantageous here that the ejector ram is developed as annular piston which can be acted on by pressure fluid from both sides. As a result, the well-proven central system of such rapid-closure couplings is retained; the annular piston lies in the field of rotational symmetry of the rapid-closure coupling utilizing the area of attack of the annular piston with respect to the other coupling half, which area is present here in a very favorable manner, i.e. tilt-free. It, furthermore, proves advantageous here that the annular piston which is seated in the one coupling half extends approximately at the level of the annular shoulder of the other coupling half lying approximately at the level of the joint between the two couplings halves and is aligned in the extended end position with the free front end of said one coupling half.

In position of separation, there is, thus, no longer even the slightest axial overlap of the two coupling halves. They drop without interference into the intended separated position. It is further proposed that the annular piston be arranged in an annular shaft of the one coupling half. This recess, also referred to as annular cylinder, can best be achieved structurally in the manner that another sleeve is simply pushed over the customary rapid-closure coupling 40 and held fast. In this way, the required variables can also be controlled, i.e. larger or smaller annular pistons associated, so that, with respect to the fluid used, the corresponding individual adjustment is also still possible subsequently.

Beyond this concept, which even has an importance of its own, it is, furthermore, proposed that the closure parts of the coupling halves, a locking sleeve associated with them and the annular piston itself be supplied by a common source of pressure fluid. Here can be employed a hydraulic fluid or else compressed air. The sequence of the initiation of the individual functions fully takes into account the safety requirements, in the manner that, due to the action of the sensor, the actuating of the closure part, i.e. closure valves takes place first, and the remaining functions follow this in logical sequence. In this connection, one particularly elegant solution, which is also of importance by itself, consists therein that the locking sleeve is blocked against displacement in the open direction by means of the front edge of an annular slide which controls the closure valves and is acted on by pressure fluid from both sides. The annular slide is developed as a bushing or sleeve into which the nipple of the coupling half on the ship side is introduced in coupling manner. When the annular slide is retracted, the valve-spring forces and the pressure of the fluid need thus no longer be overcome by the inward movement of the nipple. The nipple snaps into position against the only slight spring force of the locking sleeve. This is practically merely a halting. The coupling unit can remain for any length of time in this locking position which is achieved with only slight forces.

Finally, still other advantageous feature resides in the fact that the locking sleeve can be moved against spring action into its open position by means of several individual pistons which act on its front edge. The individual pistons, which can be associated without taking up a large amount of space, lie, also in this case, in a zone which leaves the central passage area open for the fluid to be loaded. The distribution of the individual pistons takes into account the optimal effect in the sense of a classical three-point support. To be sure, it is however already sufficient to provide two diametrically opposite individual pistons. However, an annular piston is also conceivable.

BRIEF DESCRIPTION OF THE DRAWINGS

The object of the invention will be explained in greater detail below with reference to an embodiment shown in the drawing, in which.

DETAILED DESCRIPTION OF THE PREFERRED EMBODIMENT

Figure 1:
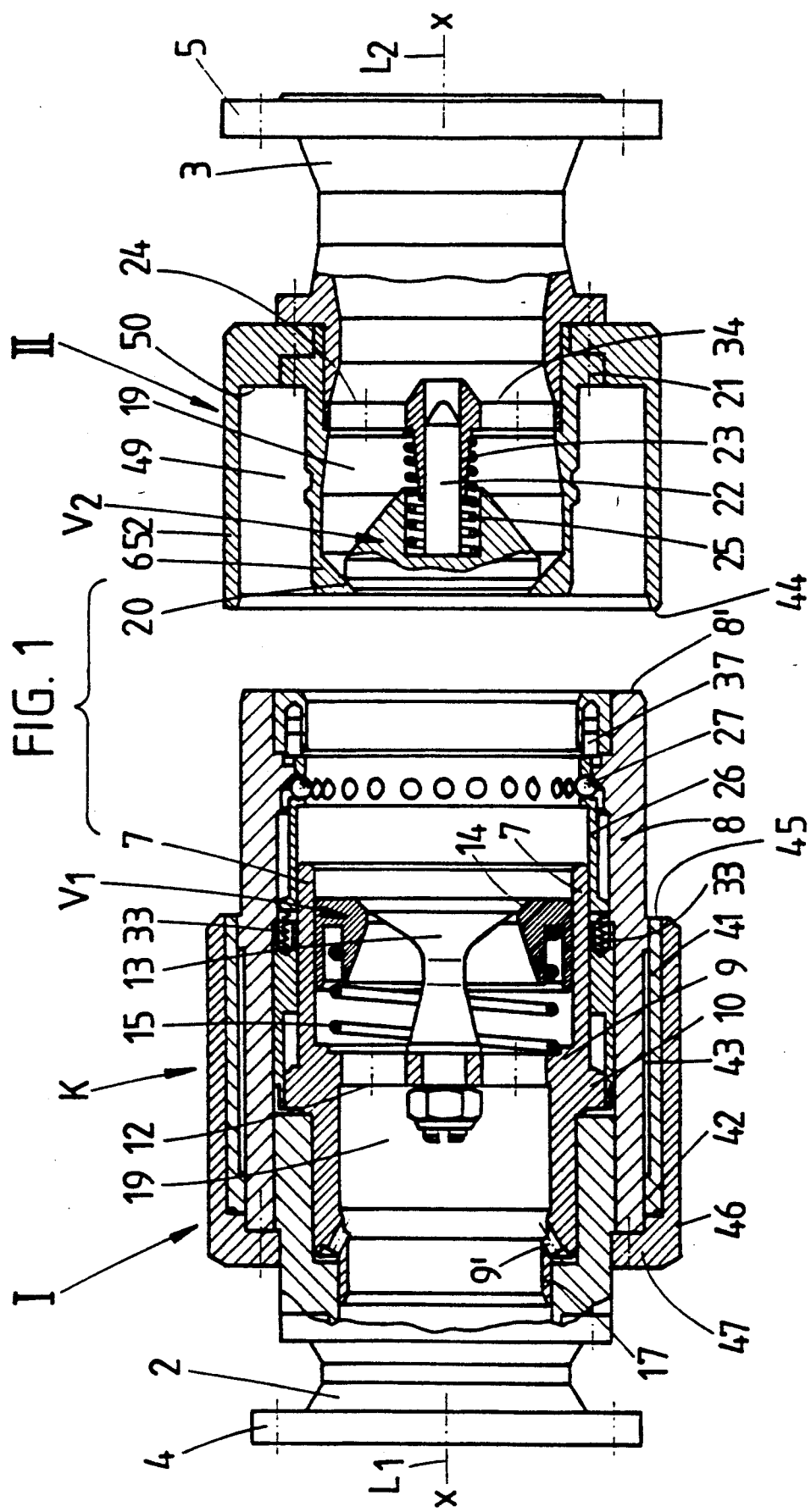
FIG. 1 shows the rapid-closure coupling in starting position, i.e. uncoupled and with the closure valves closed; the two coupling halves being partially broken away in the longitudinal central plane.

The coupling developed in accordance with the invention is a rapid-closure coupling K. Its one coupling half I is connected to a so-called ship loader via a fueling line L1.

The corresponding other coupling half, designated II, is connected to the fueling line L2 leading to a ship.

At the outlet ends of each of the two coupling halves I, II, there is a connection piece 2 and 3 respectively with corresponding flange 4 and 5 respectively.

Depending on the direction of flow of the fluid, the one fueling line forms the so-called feed line and the other one, accordingly, the so-called discharge line.

As a function of a sensor-recorded displacement of the feed line with respect to the discharge line, the closure means incorporated in the rapid-closure coupling K, in this case, a closure valve V1 in the one coupling half I and a closure valve V2 in the other coupling half II, are blocked abruptly. The sensor device does not require any further explanation or showing.

The coupling half II on the ship side has a centrally arranged nipple 6 which is formed by an annular wall. The nipple can be brought into a sealing, locked plug-connection with a sleeve or bushing 7 of the one coupling half I. The latter 7 is the component which is directed outward towards the right of an annular slide 9 which is axially displaceable, limited by stop, in the housing 8 of the one coupling half I. The outer wall of the annular slide forms a piston 10. The latter can be acted on by pressure fluid from both sides. The one connection point which feeds a cylindrical space 11 of the piston 10 is designated A1 (see FIG. 3). It is located on the side of the piston 10 which faces the other coupling half II. The other one, lying on the other side, is designated A2. Their feed lines lead in a closable or openable manner to a common source of pressure fluid via intermediate control valves (not shown in detail).

The annular slide 9 is part of the shut-off valve V1 on the loader side. It bears for this purpose a centrally located valve ram 13 on a transverse wall 12 provided with numerous perforations. The valve ram forms a rear valve-seat surface 14 on a cup-shaped head. The corresponding annular surface of the shut-off valve V1 cooperates with said valve-seat surface 14. A helical compression spring 15 holds the valve body of the shut-off valve V1 applied in tightly sealing manner. The far end of the compression spring rests against the above-mentioned transverse wall 12 in centered position. The other end of the compression spring 15 is also centered in position due to the development of the valve body as an annular shaft.

The displacement limitation of the annular slide 9 is achieved by stops on the housing side in the region of the cylinder 11, namely with participation of annular shoulders present there and of the end sides of the piston 10.

The annular slide 9 is held in its basic position via the connection point A1. This end position can be avoided via an identification N2 in the region of the outwardly directed end of the annular slide 9. An approximation initiator 16 seated in the base of the connection piece 2 there serves as identification element. It is directed radially and cooperates with a screen-like extension 17 of rotational symmetry which moves over a step supporting the approximation initiator 16. In order to avoid the inclusion of fluid in this region, a cut-off canal 9' is arranged between the annular-wall-like extension 17 and the end region of the annular slide 9 over which said extension extends, the said canal communicating with the central passage channel 19 of the rapid-closure coupling K.

With regard to the closure parts of the other coupling half II, they also consist of a spring-urged valve body, designated as shut-off valve V2. The corresponding valve-seat surface 20 of the housing 21 there forms an annular inner flank in the free end of the nipple 6. This valve body has a centrally arranged shaft 22 directed towards the connection piece 3. The shaft 22 is guided in a stationary socket 23 which extends from a transverse wall 24 provided with numerous perforations, present also in this case.

The shut-off valve V2 is, as shown, also urged by spring in the closing direction. The corresponding helical compression spring bears the reference numeral 25. It is supported at one end on the nipple-side broad surface of the transverse wall 24 and at its other end in a spring chamber of the valve body of the shut-off valve V2, which chamber is concentric to the shaft 22.

The insertable end of the nipple 6 has an outside diameter which corresponds to the inside diameter of the sleeve or bushing 7 of the annular slide 9 so that the annular end surface of the nipple 6 can lift the corresponding annular end surface of the shut-off valve V1 against the force of the compression spring 15 off from the valve-seat surface 14.

A locking sleeve 26 is incorporated in the rapid-closure coupling K. The locking sleeve 26 is axially displaceable, limited by stop. Locking balls 27 serve as locking elements. The locking balls are received in a secure manner in conical or radial bore holes in the locking sleeve 26, which at the same time serves as a kind of ball cage. The taper of the bore cone tapers inward. In the uncoupled position, the locking balls 27 are in evasive position, i.e. they enter into an annular groove 28 of the housing 8, which groove is provided with control surfaces. In precontrolled position of the locking sleeve 26, a control bevel 29 of the annular groove 28 lifts the locking balls 27 to such an extent that they enter in blocking manner into a corresponding annular groove 30 on the wall surface of the nipple 6.

The annular groove 30 has outwardly converging annular flanks. The angle of inclination of the flanks is 45° to the longitudinal central axis X—X of the rapid-closure coupling K. The control bevel 29 has a corresponding course. Its blocking mating flank is the one designated 30' of the annular groove 30. The other flank 30" of the annular groove 30 cooperates with the side present there of the conical radial bore, as support for the balls 27.

The other side of the radial bore which is closer to the connection piece 2 forms a stop 31 on its rear. As a result, the locking sleeve 26 is blocked against displacement in open direction when the shut-off valves V1, V2 are open.

In the region of the stop 31, the locking sleeve 26 has a larger wall thickness, this also in the interest of the formation of sufficiently long radial bores. The shoulder which forms the stop 31 and was created by cutting out from the locking sleeve 26 results at the same time in a correspondingly wide space for the bushing 7 of the annular slide 9, which bushing moves in overlapping manner into the locking sleeve. The end edge of the annular slide 9 or bushing 7 respectively present there is designated 32 and is thus included in the control of the closure parts via the slide 9 which is acted on by pressure fluid from both sides.

The flank 30' has a pre-flank 30''' in front of it which controls the blocking balls 27.

Figure 3:
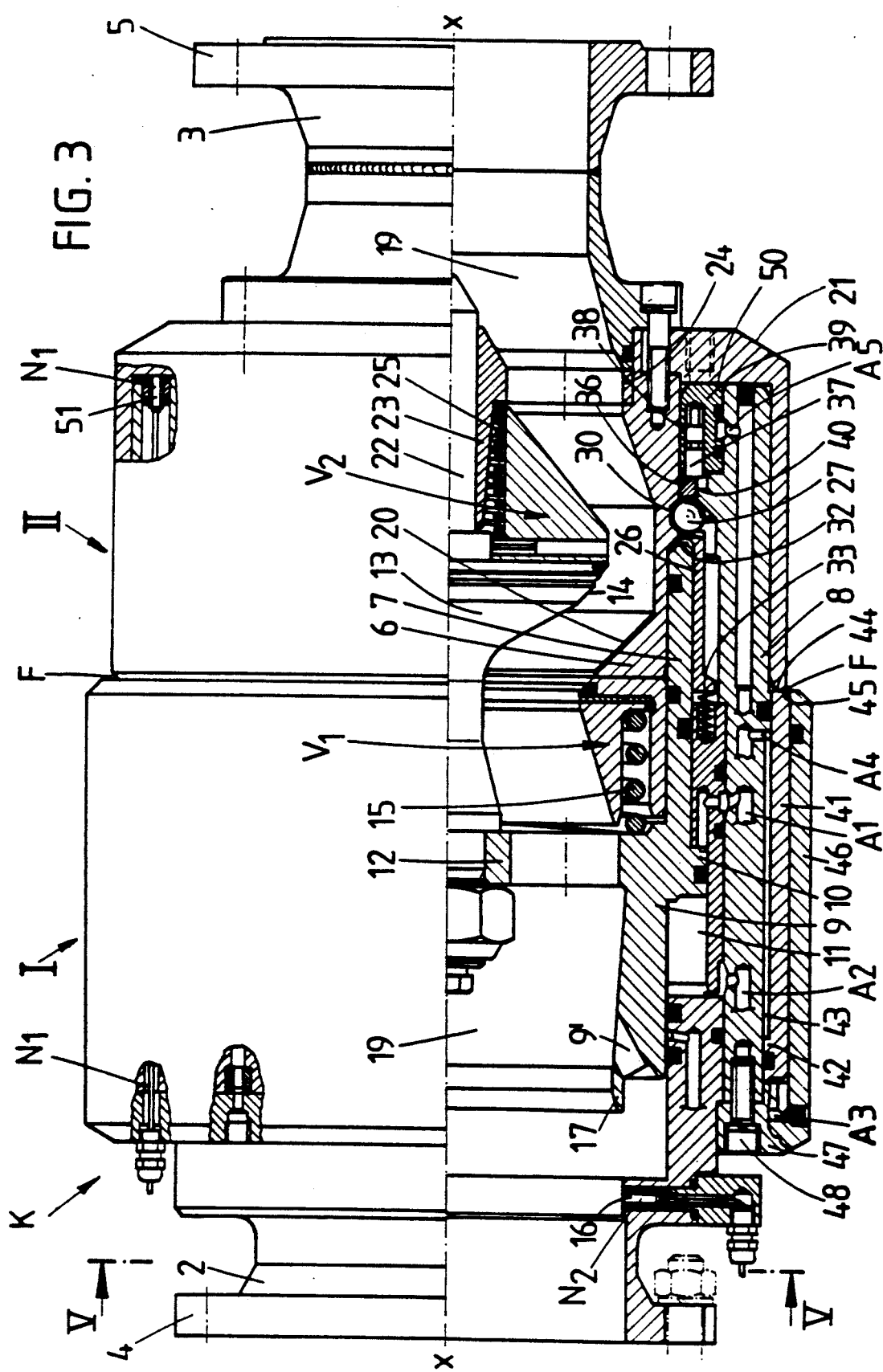
FIG. 3 shows the so-called refueling position (valves open) in half section and with a more detailed showing of the coupling of the invention.

The locking sleeve 26 is urged by spring in the direction of its basic position which can be noted particularly clearly from FIG. 3. Several axially directed compression springs 33 are used. They are each seated in a blind hole 34 in the housing 8. For instance, three such compression springs are arranged in an annular shoulder of the housing 8. They supply a well-balanced spring action against the end of the locking sleeve 26 which faces them, which is provided with a correspondingly thicker wall in the region of its space. The thickening is directed peripherally outward.

In order to bring about the locking position, the force of pressurized fluid applied to coupling half II need overcome merely the slight force of the compression springs 33 and not that of the valve compression springs 15 and 25; this is effected, as mentioned above, via the slide 9 which is controlled by auxiliary fluids.

In the basic position, the spring-loaded end 35 present there assumes an axial spacing y from the corresponding annular shoulder of the housing 8. This spacing y corresponds to the release stroke for the blocking balls 27.

The displacement of the locking sleeve 26 which is acted on by pressure fluid and also recorded by sensor is effected by means of several individual pistons 37 which act against its other end edge 36 present there. Said pistons extend in cylinder chambers 38 of the housing 8 which are aligned parallel to the longitudinal central axis x—x of the rapid-closure coupling K. The feeding of pressure fluid to the individual cylinder chambers 38 takes place at the connection points designated A5. These connection points of the individual pistons 37 which are arranged with equal angular spacing are also in communication with the above-mentioned common source of pressure fluid, namely via interposed program-controlled valves. The transverse channel debouching in the rear of the individual pistons 37 is arranged in an insert ring 39 associated with the housing 8.

In order to secure the individual pistons 37 in their extended position against emergence, a partial section of their end surface lies in the region of a rotationally symmetric blocking shoulder 40 of the housing 8. In the basic position of the coupling, said blocking shoulder 40 lies at an axial distance from the end surface of the individual pistons 37 which corresponds to the distance x.

There is associated with the coupling, developed as a rapid-closure coupling K, an ejector ram 41 which is also acted on by pressure fluid as a result of the action of a sensor and which is also axially displaceable and limited by a stop. The corresponding outward displacement of the ejector ram 41 leads to a practically instant separation of the two coupling halves I, II. As already indicated, this separation is preceded by the also sensor-induced closing of the shut-off valves V1, V2 and the unlocking.

The ejector ram 41 is advisedly an annular piston which can be acted on by pressure fluid from two sides. The piston 42 proper is seated on the end of this annular body which faces the connection piece 2. It lies on the inside and acts on the housing side in a cylinder chamber 43 of the housing 8. The one connection point which causes the extending of the ejector ram 41 is located in the region of the bottom of the housing 8 and is designated A3. Said connection point, in the same way as the one located in the region of the end facing away from the connection piece 2, is connected to the above-mentioned central source of pressure fluid, also in this case with the interposition of the required control valves of a program.

Figure 4:
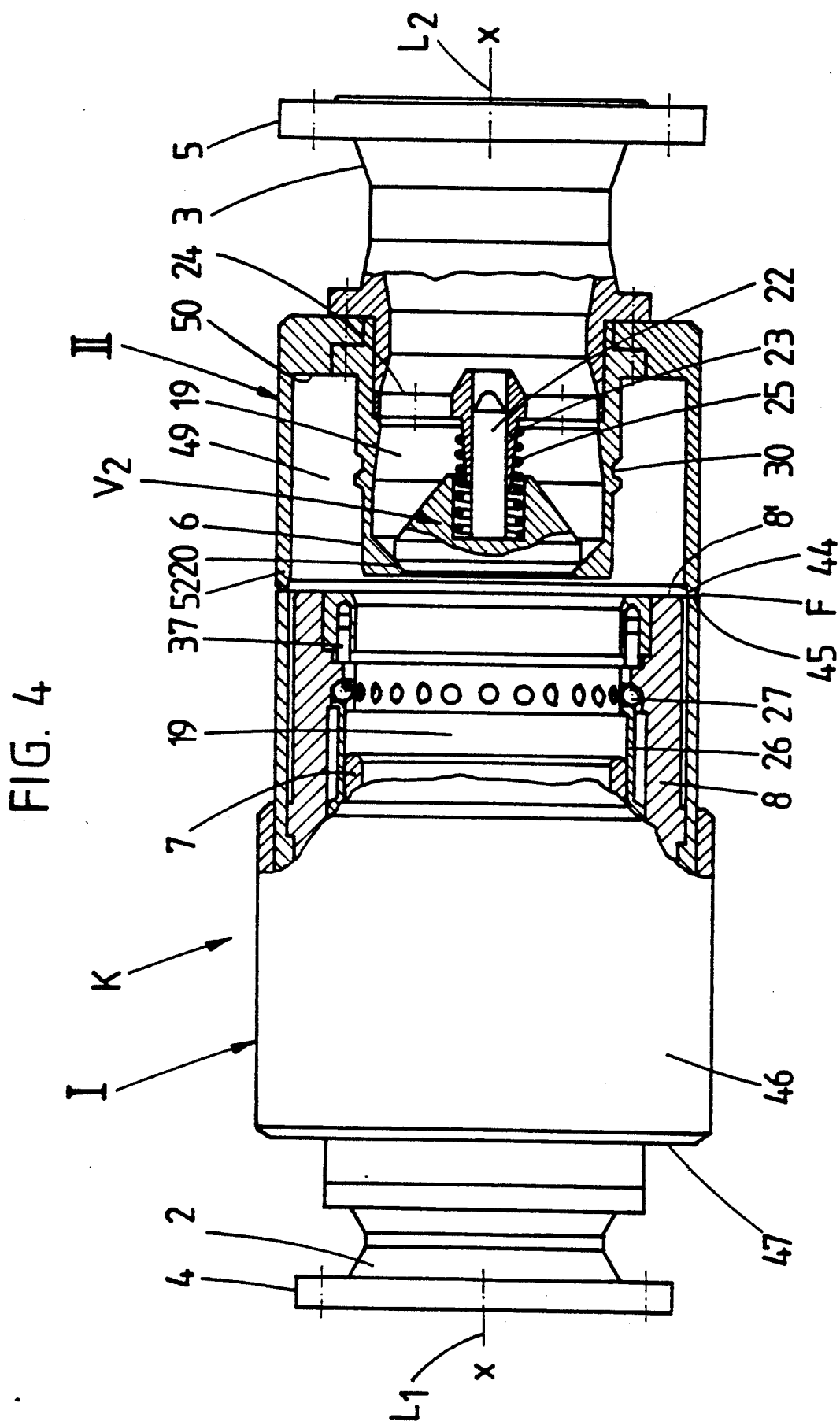
FIG. 4 shows the uncoupling position in which the valves are again closed and the ejector ram has assumed its maximum extended position, in which the coupling half on the ship side can be freely separated (simplified showing corresponding to FIGS. 1 and 2)
Figure 5:
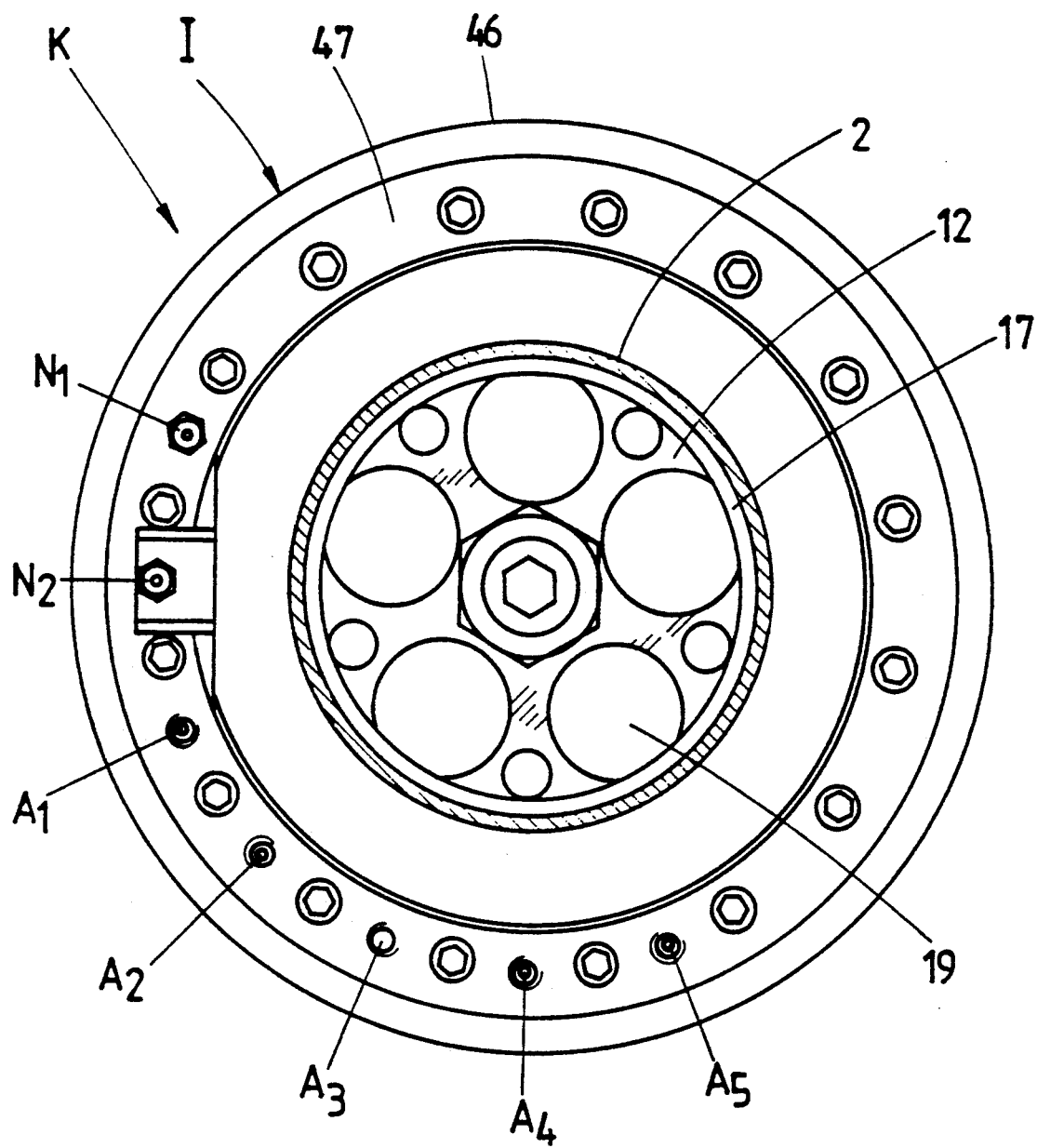
FIG. 5 is a section along the line V—V of FIG. 3, indicating the precise position of the connection positions for the auxiliary fluid.
Figure 6:
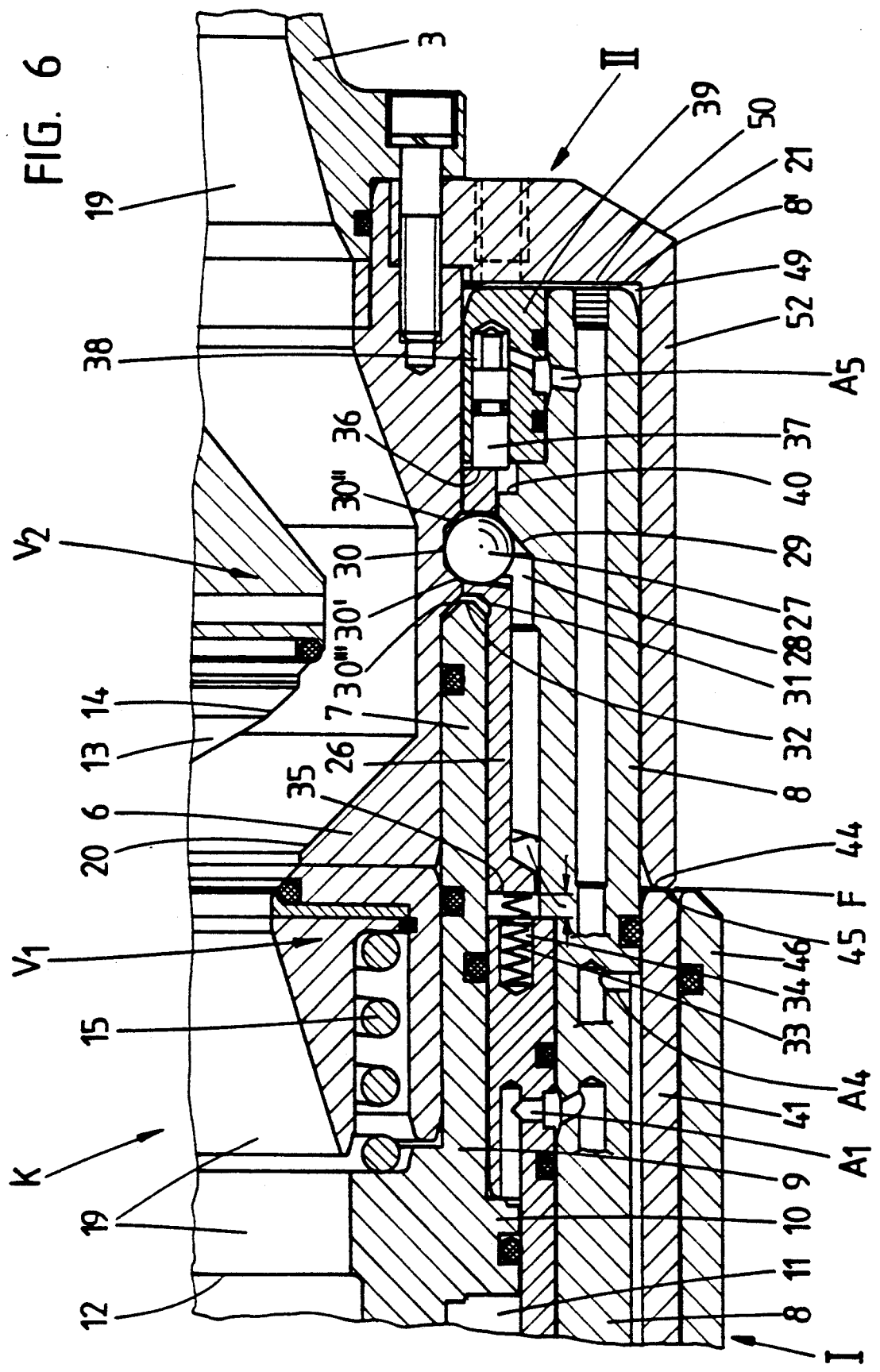
FIG. 6 is an enlargement of a detail of the locking sleeve portion.

The further structural development is such that the annular piston of the ejector ram 41 seated in the one coupling half I extends directly in front of an annular shoulder 44 of the other coupling half II, said annular shoulder 44 being located approximately at the level of the parting plane F of the two coupling halves I, II which is visible from the outside. The ram-active end of the ejector ram 41 bears reference numeral 45. The axial length of the ejector ram 41 is so dimensioned that in fully extended end position of the ejector ram 41 its end 45 is aligned with the free-end 8' of the one coupling half I (see FIG. 4). The coupling half II can thus detach itself even transversely, leaving the common longitudinal central axis x—x.

The peripheral closure of the cylinder chamber 43 and actually of the entire annular shaft of the one coupling half I receiving the annular piston 41 is effected by an annular wall 46 which concentrically surrounds the housing 8 and which is flanged onto the housing 8 facing away from the joint via an inward directed bottom section 47 by means of attachment screws 48.

The stepped-down section of the housing 8 which continues on the joint side beyond the annular wall 46 has a length which can be fully accommodated axially in a cup ring of the other coupling half II. The corresponding annular space of this coupling half bears the reference numeral 49. Its cup bottom 50 forms the mating exciter surface for an approximation initiator 51 located in the end 45 of the housing 8 (see FIG. 3), which approximation initiator is connected to the identification N1 and is provided in addition to the above-mentioned identification N2 which reports, for instance, the closed condition of the shut-off valves V1, V2.

In the sectional showing of FIG. 3, the connection points A1–A5 are shown in easily recognizable manner in the same way as the identification points N1, N2.

All places requiring seals are provided with O-rings which are partially inserted in grooves.

Figure 2:
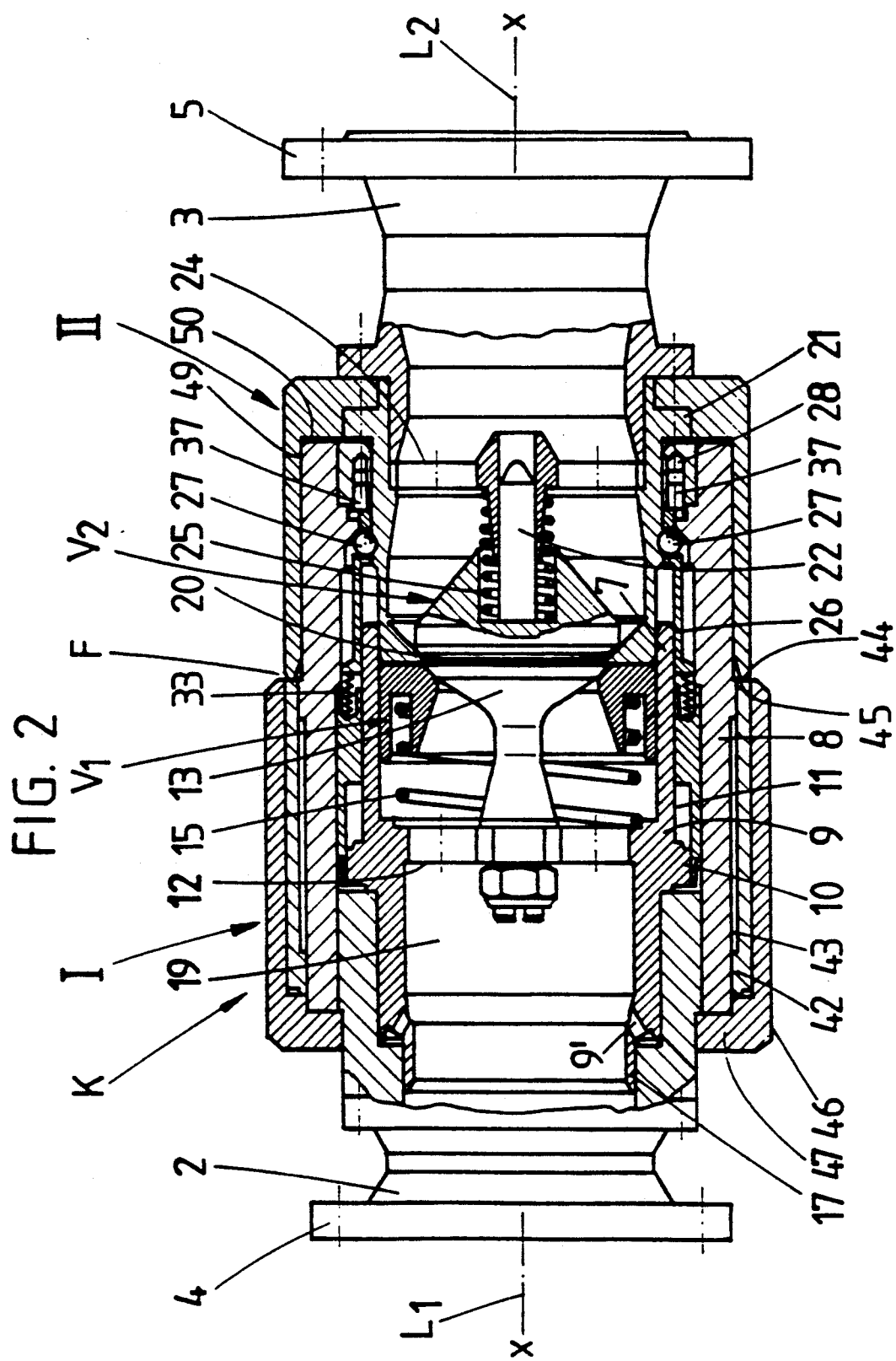
FIG. 2 shows the rapid-closure coupling in coupled position but with the closure valves still closed.

The operation, briefly stated, is as follows: For the coupling of the rapid-closure coupling K with due consideration of the starting position shown in FIG. 1 in which both shut-off valves V1, V2 are closed, the coupling position in accordance with FIG. 2 is brought about, namely by coaxial approximation and introduction of the nipple 6 (fixed part mounted on the ship side, so-called clean-break closure nipple) into the loose part (clean break closure coupling) which is arranged as termination of the loader arm on the ship loader. This is effected against the relatively slight force of the locking-sleeve compression springs 33. The corresponding control valves of the connection points A1/A4 have previously been acted on by control pressure. The closure coupling K was ready for coupling. The coupling halves I/II can be moved together. This can be done manually or by the ship loader. This takes place until the locking engages and the identification N1 takes place. The coupling unit can remain in this position as long as desired.

The control pressure is now transferred from A1 to A2. The shut-off valves V1, V2 present in the coupling half 1 and the closure nipple 6 are opened. The identification N2 reports this fueling position "Both shut-off valves open". For proper uncoupling, the control pressure is transferred back again from A2 to A1. The two shut-off valves V1, V2 of the coupling halves I, II are closed.

Control pressure is now applied at the connection point A5. The lock is unlocked. This separation can again take place manually or via the ejector function. For this purpose, control pressure is switched from connection point A4 to connection point A3.

In addition to this normal function, there can be effected, during the action of the so-called drift protection system, the sudden separation of the coupling halves, i.e. the ejecting of the coupling II via the extending of the ejector ram 41 which, however, is possible only in necessary dependence on the sequence of functions explained in the specification, i.e. in each case always the closing of the shut-off valves V1, V2 with displacement of the annular slide 9 out of the blocking region of the locking sleeve 26. The ejector ram 41 can push away the ship-side coupling half II via the annular wall 52 only when the locking balls 27 have left the nipple 6, i.e. its annular groove 30.

Leakage losses are practically excluded.

I claim:

1. A coupling suitable for installation in fueling lines or the like including a feed line and a discharge line, the coupling including a first coupling half connected to the discharge line and a second coupling half connected to the feed line, the coupling having closure means which block the flow path of a fluid, the closure means being brought into a closed position as a function of displacement of the feed line relative to the discharge line;

wherein the coupling is a rapid-closure coupling comprising an ejector ram which is acted on by a pressure fluid due to the action of a sensor, the closure means includes a first shut-off valve disposed in said first coupling half, and a second shut-off valve disposed in said second coupling half;

said coupling further comprises a first annular piston coupled to said first shut-off valve and being slidable along said first coupling half under fluid pressure for opening and closing said closure means;

the ram, upon activation by the pressure fluid, provides for a separation of the two coupling halves from a junction of the two coupling halves, the junction having been established previously by a switching of control pressure, the first and the second shut-off valves being closed upon a switching of control pressure;

said second coupling half has an annular shoulder;

the ejector ram includes a second annular piston seated in said first coupling half and extending directly in front of the annular shoulder of the second coupling half; and the shoulder is located approximately at the height of a parting line of the two coupling halves, and is aligned in extended final position with a free end of the first coupling half.

2. A coupling, according to claim 1, wherein said second annular piston of the ejector ram is actuatable by pressure fluid on both sides of the ram.

3. A coupling according to claim 1, wherein said first coupling half comprises an annular shaft; and said second annular piston of the ejector ram is arranged in the annular shaft of the first coupling half.

4. A coupling according to claim 3, further comprising
   a locking sleeve operatively coupled to said closure means; and
   wherein the closure parts of the coupling halves, the locking sleeve, and the second annular piston of the ejector ram are fed by a common source of pressure fluid.

5. A coupling according to claim 4,
   wherein the locking sleeve is blocked against displacement in opening direction by means of an end edge of the first annular piston which controls the shut-off valves and is actuatable by pressure fluid from both sides.

6. A coupling device according to claim 4, further comprising
   several individual pistons; and
   wherein the locking sleeve is displaceable against spring action into an open position by means of the several individual pistons acting on its end edge.

7. A coupling suitable for installation in fueling lines or the like including a feed line and a discharge line, the coupling including a first coupling half connected to the discharge line and a second coupling half connected to the feed line, the coupling having closure means which block the flow path of a fluid, the closure means being brought into a closed position as a function of displacement of the feed line relative to the discharge line;

wherein the coupling is a rapid-closure coupling comprising an ejector ram which is acted on by a pressure fluid due to the action of a sensor, the closure means includes a first shut-off valve disposed in said first coupling half, and a second shut-off valve disposed in said second coupling half;

said coupling further comprises a first annular piston coupled to said first shut-off valve and being slidable along said first coupling half under fluid pressure for opening and closing said closure means;

the ram, upon activation by the pressure fluid, provides for a separation of the two coupling halves from a junction of the two coupling halves, the junction having been established previously by a switching of control pressure, the first and the second shut-off valves being closed upon a switching of control pressure;

said first coupling half comprises an annular shaft; and the ejector ram includes a second annular piston which is arranged in the annular shaft of the first coupling half;

the coupling further comprises a locking sleeve operatively coupled to said closure means; and wherein the closure parts of the coupling halves, the locking sleeve, and the second annular piston are fed by a common source of pressure fluid.

8. A coupling device according to claim 7, further comprising
several individual pistons; and
wherein the locking sleeve is displaceable against spring action into an open position by means of the several individual pistons acting on its end edge.

* * * * *